United States Patent
Overson et al.

(10) Patent No.: US 10,216,488 B1
(45) Date of Patent: *Feb. 26, 2019

(54) INTERCEPTING AND INJECTING CALLS INTO OPERATIONS AND OBJECTS

(71) Applicant: Shape Security, Inc., Mountain View, CA (US)

(72) Inventors: Jarrod Overson, Santa Clara, CA (US); Siying Yang, Cupertino, CA (US)

(73) Assignee: Shape Security, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/069,667

(22) Filed: Mar. 14, 2016

(51) Int. Cl.
*G06F 9/44* (2018.01)
*G06F 8/30* (2018.01)
*H04L 29/06* (2006.01)

(52) U.S. Cl.
CPC ............ *G06F 8/30* (2013.01); *H04L 63/0407* (2013.01); *H04L 63/0428* (2013.01); *H04L 63/1433* (2013.01); *H04L 67/42* (2013.01)

(58) Field of Classification Search
CPC ........................... G06F 21/14; G06F 2209/542
See application file for complete search history.

(56) References Cited

U.S. PATENT DOCUMENTS 6,606,663 B1    8/2003   Liao
6,668,325 B1   12/2003   Collberg (Continued)

FOREIGN PATENT DOCUMENTS

WO    WO2013091709    6/2013

OTHER PUBLICATIONS

International Searching Authority, "Search Report" in application No. PCT/US15/52030, dated Dec. 22, 2015, 17 pages.

(Continued)

*Primary Examiner* — Duy Khuong T Nguyen
(74) *Attorney, Agent, or Firm* — Wei & Sleman LLP

(57) ABSTRACT

A computer implemented method for improving security of a server computer that is configured to deliver computer program instructions to a remote client computer, and comprising, using an intermediary computer that is topologically interposed between the server computer and the remote client computer is provided. The intermediary computer is configured to intercept a first set of source code instructions from the server computer. The intermediary computer identifies first party operations that include operations on objects and the objects themselves. The intermediary computer identifies a first set of operations within the first party operations that are configured to define values for one or more objects based on one or more constants. The intermediary computer then generates a second set of operations, where the second set of operations are configured to define same values for the one or more objects, when executed by a web browser on the client computer. The intermediary computer transforms the first party operations into transformed first party operations by substituting the first set of operations with the second set of operations. The intermediary computer generates a second set of source code instructions that are based on the first set of source code instructions and the transformed first party operations. The intermediary computer then sends the second set of source code instructions to the client computer.

22 Claims, 5 Drawing Sheets

(56) References Cited

U.S. PATENT DOCUMENTS

| | | | |
|---|---|---|---|
| 6,938,170 B1 | 8/2005 | Kraft | |
| 7,058,699 B1* | 6/2006 | Chiou | G06F 8/51 |
| | | | 709/219 |
| 7,174,565 B2 | 2/2007 | Kadyk et al. | |
| 7,480,385 B2 | 1/2009 | Weber | |
| 7,707,223 B2 | 4/2010 | Zubenko et al. | |
| 7,797,421 B1 | 9/2010 | Scofield | |
| 7,836,425 B2 | 11/2010 | Rubin et al. | |
| 7,895,653 B2 | 2/2011 | Calo et al. | |
| 8,015,301 B2 | 9/2011 | Carter et al. | |
| 8,020,193 B2 | 9/2011 | Bhola et al. | |
| 8,132,242 B1 | 3/2012 | Wu | |
| 8,200,958 B2 | 6/2012 | Coppola et al. | |
| 8,266,202 B1 | 9/2012 | Colton et al. | |
| 8,424,090 B2 | 4/2013 | Kang | |
| 8,473,620 B2 | 6/2013 | Demmer et al. | |
| 8,510,571 B1 | 8/2013 | Chang | |
| 8,806,187 B1* | 8/2014 | Vemula | H04L 67/34 |
| | | | 713/150 |
| 8,806,627 B1 | 8/2014 | Aharoni | |
| 8,954,583 B1* | 2/2015 | Zhou | H04L 67/42 |
| | | | 709/224 |
| 9,083,739 B1 | 7/2015 | Call et al. | |
| 9,241,004 B1 | 1/2016 | April | |
| 9,294,502 B1 | 3/2016 | Benishti | |
| 9,338,143 B2 | 5/2016 | Hansen | |
| 9,582,666 B1* | 2/2017 | Overson | G06F 21/572 |
| 2003/0217287 A1 | 11/2003 | Kruglenko | |
| 2005/0108562 A1 | 5/2005 | Khazan | |
| 2005/0114705 A1 | 5/2005 | Reshef et al. | |
| 2005/0182958 A1 | 8/2005 | Pham | |
| 2005/0183072 A1* | 8/2005 | Horning | G06F 21/14 |
| | | | 717/140 |
| 2006/0036870 A1 | 2/2006 | Dasari | |
| 2006/0155869 A1 | 7/2006 | Nanduri et al. | |
| 2006/0195703 A1 | 8/2006 | Jakubowski | |
| 2006/0253687 A1 | 11/2006 | Jakubowski | |
| 2006/0282897 A1 | 12/2006 | Sima et al. | |
| 2007/0118669 A1 | 5/2007 | Rand | |
| 2007/0186106 A1 | 8/2007 | Ting | |
| 2007/0234070 A1 | 10/2007 | Horning | |
| 2008/0222736 A1 | 9/2008 | Bodaei et al. | |
| 2009/0007243 A1 | 1/2009 | Boodaei et al. | |
| 2009/0119504 A1 | 5/2009 | Van et al. | |
| 2009/0119515 A1* | 5/2009 | Nicolson | G06F 21/14 |
| | | | 713/190 |
| 2009/0144829 A1 | 6/2009 | Grigsby et al. | |
| 2009/0241174 A1 | 9/2009 | Rajan et al. | |
| 2009/0249310 A1 | 10/2009 | Meijer et al. | |
| 2010/0257354 A1 | 10/2010 | Johnston et al. | |
| 2010/0287132 A1 | 11/2010 | Hauser | |
| 2011/0035733 A1 | 2/2011 | Horning | |
| 2011/0107077 A1 | 3/2011 | Henderson et al. | |
| 2011/0296391 A1 | 12/2011 | Gass et al. | |
| 2011/0314091 A1 | 12/2011 | Podjarny | |
| 2012/0022942 A1* | 1/2012 | Holloway | H04L 63/1416 |
| | | | 705/14.49 |
| 2012/0096116 A1 | 4/2012 | Mislove et al. | |
| 2012/0124372 A1 | 5/2012 | Dilley et al. | |
| 2012/0311715 A1 | 12/2012 | Tal et al. | |
| 2013/0061055 A1 | 3/2013 | Schibuk | |
| 2013/0067225 A1 | 3/2013 | Shochet | |
| 2013/0091425 A1 | 4/2013 | Hughes et al. | |
| 2013/0173782 A1 | 7/2013 | Ragutski et al. | |
| 2013/0198607 A1 | 8/2013 | Mischook et al. | |
| 2013/0232234 A1 | 9/2013 | Kapur et al. | |
| 2014/0089786 A1 | 3/2014 | Hashmi | |
| 2014/0130182 A1 | 5/2014 | Yackanich | |
| 2014/0189499 A1 | 7/2014 | Gigliotti et al. | |
| 2014/0189808 A1 | 7/2014 | Mahaffey | |
| 2014/0223290 A1 | 8/2014 | Hathaway | |
| 2014/0250514 A1 | 9/2014 | Blomquist et al. | |
| 2014/0298469 A1 | 10/2014 | Marion | |
| 2015/0134956 A1 | 5/2015 | Stachura | |
| 2015/0271188 A1 | 9/2015 | Call | |
| 2015/0278491 A1 | 10/2015 | Horning | |
| 2015/0350181 A1 | 12/2015 | Call et al. | |
| 2016/0050231 A1 | 2/2016 | Varadarajan et al. | |
| 2016/0094575 A1 | 3/2016 | Shekyan | |
| 2016/0147992 A1 | 5/2016 | Zhao et al. | |
| 2016/0344769 A1 | 11/2016 | Li | |
| 2016/0359901 A1 | 12/2016 | Yang | |
| 2017/0012960 A1 | 1/2017 | Idika | |
| 2017/0013012 A1 | 1/2017 | Hansen | |
| 2017/0264623 A1 | 9/2017 | Ficarra | |
| 2018/0048671 A1 | 2/2018 | Shekyan | |
| 2018/0121680 A1 | 5/2018 | Wang | |
| 2018/0159830 A1 | 6/2018 | Gibbons | |

OTHER PUBLICATIONS

International Searching Authority, "Search Report" in application No. PCT/US15/32060, dated Aug. 25, 2015, 10 pages.

U.S. Appl. No. 14/290,805, filed May 29, 2014, Notice of Allowance, dated Aug. 24, 2015.

International Searching Authority, "Search Report" in application No. PCT/2016/018081, dated Apr. 25, 2016, 13 pages.

Claims in application No. PCT/US2016/018081, dated Apr. 2016, 6 pages.

U.S. Appl. No. 15/011,172, filed Jan. 29, 2016, Office Action, dated Apr. 18, 2016.

U.S. Appl. No. 14/673,669, filed Mar. 30, 2015, Office Action, dated Apr. 28, 2016.

U.S. Appl. No. 14/502,893, filed Sep. 30, 2014, Office Action, dated Apr. 20, 2016.

U.S. Appl. No. 14/552,331, filed Nov. 24, 2014, Office Action, dated May 6, 2016.

CTNF, mailed on Aug. 4, 2017, re: Siying Yang, U.S. Appl. No. 15/242,062, filed Aug. 19, 2016.

NOA, mailed on Feb. 21, 2017, re: Shekyan et al., U.S. Appl. No. 14/502,893, filed Sep. 30, 2014.

NOA, mailed on Mar. 16, 2017, re: Justin Call, U.S. Appl. No. 14/738,913, filed Jun. 14, 2015.

NOA, mailed on Jun. 1, 2017, re: Sergey Shekyan, U.S. Appl. No. 14/502,893, filed Sep. 30, 2014.

CTNF, mailed on Apr. 4, 2017, re: Jarrod Overson, U.S. Appl. No. 15/069,667, filed Mar. 14, 2016.

CTNF, mailed on Apr. 7, 2017, re: Yao Zhao, U.S. Appl. No. 14/861,906, filed Sep. 22, 2015.

CTNF, mailed on Jun. 21, 2017, re: Zhiwei Li, U.S. Appl. No. 14/718,736, filed May 21, 2015.

International Search Report for PCT/US17/21409, dated May 23, 2017, Shape.

NOA, mailed on Sep. 18, 2017, re: Xinran Wang, U.S. Appl. No. 14/286,324, filed May 23, 2014.

NOA, mailed on Oct. 25, 2017, re: Xinran Wang, U.S. Appl. No. 14/286,324, filed May 23, 2014.

CTFR, mailed on Oct. 30, 2017, re: Jarrod Overson, U.S. Appl. No. 15/069,667, filed Mar. 14, 2016.

NOA, mailed on Nov. 29, 2017, re: Xinran Wang, U.S. Appl. No. 14/286,324, filed May 23, 2014.

NOA, mailed on Dec. 18, 2017, re: Yao Zhao, U.S. Appl. No. 14/861,906, filed Sep. 22, 2015.

NOA, mailed on Jan. 5, 2018, re: Yao Zhao, U.S. Appl. No. 14/861,906, filed Sep. 22, 2015.

NOA, mailed on Jan. 25, 2018, re: Zhiwei Li, U.S. Appl. No. 14/718,736, filed May 21, 2015.

CTNF, mailed on Apr. 25, 2018, re: Ganesh Jampani, U.S. Appl. No. 15/249,133, filed Aug. 26, 2016.

NOA, mailed on Mar. 15, 2018, re: Sergey Shekyan, U.S. Appl. No. 15/791,291, filed Oct. 23, 2017.

CTFR, mailed on Apr. 9, 2018, re: Siying Yang, U.S. Appl. No. 15/242,062, filed Aug. 19, 2016.

CTNF, mailed on May 15, 2018, re: Marc R. Hansen, U.S. Appl. No. 15/202,755, filed Jul. 6, 2016.

CTNF, mailed on May 23, 2018, re: Jarrod Overson, U.S. Appl. No. 15/069,667, filed on Mar. 14, 2016.

(56) References Cited

OTHER PUBLICATIONS

CTFR, dated Nov. 1, 2018, re: Marc. R. Hansen, U.S. Appl. No. 15/202,755, filed Jul. 6, 2016.
CTNF, dated Feb. 1, 2018, re: Nwokedi Idika, U.S. Appl. No. 15/204,710, filed Jul. 7, 2016.
NOA, dated Sep. 19, 2018, re: Nwokedi Idika, U.S. Appl. No. 15/204,710, filed Jul. 7, 2016.
NOA, dated Oct. 24, 2018, re: Jarrod Overson, U.S. Appl. No. 15/069,667, filed Mar. 14, 2016.
NOA, dated Oct. 26, 2018, re: Ganesh Jampani, U.S. Appl. No. 15/249,133, filed Aug. 26, 2016.
NOA, dated Nov. 27, 2018, re: Nwokedi Idika, U.S. Appl. No. 15/204,710, filed Jul. 7, 2016.

* cited by examiner

INTERCEPTING AND INJECTING CALLS INTO OPERATIONS AND OBJECTS

FIELD OF THE DISCLOSURE

The present disclosure generally relates to security techniques applicable to client/server systems, and relates more specifically to techniques for improving resistance of server computers to attacks by client computers. SUGGESTED GROUP ART UNIT: 2441; SUGGESTED CLASS/SUB-CLASS: 709/224.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A scripting language is a programing language for writing computer programs in the form of scripts. Examples of scripting languages include JavaScript or ECMAScript, ActionScript, Dart, VBScript, Typescript, Ruby, and Python. A script is a program distributed as source code and executed by interpretation rather than compilation. Interpretation is advantageous because deployment and customization are simplified. These advantages make scripting well suited for adding custom behaviors to an already installed application, such as a web browser. Browser support has made JavaScript the most widely used programing language for the Internet.

Execution by interpretation may also present drawbacks for a scripting language. Since a script is distributed to a browser as source code, security and intellectual property are heightened concerns. Source code is vulnerable to reverse engineering, copying, spoofing, and cracking. For example, when script source code is delivered to a browser, malicious programs can alter the script source code for malicious purposes, such as capturing passwords, bank information, and other sensitive information, causing the browser to execute the maliciously altered script source code rather than the original script source code that the server computer generated. Algorithms and data are difficult to hide when source code is publicized.

Machine analysis is an important part of misuse of source code. For example, internet bots programmed to run automated tasks, compromised endpoints, or malicious software may attempt to read and analyze source code for malicious purposes. To achieve security by obscurity, techniques are needed to prevent or encumber machine analysis of scripts.

SUMMARY

The appended claims may serve as a summary of the invention.

Figure 1:
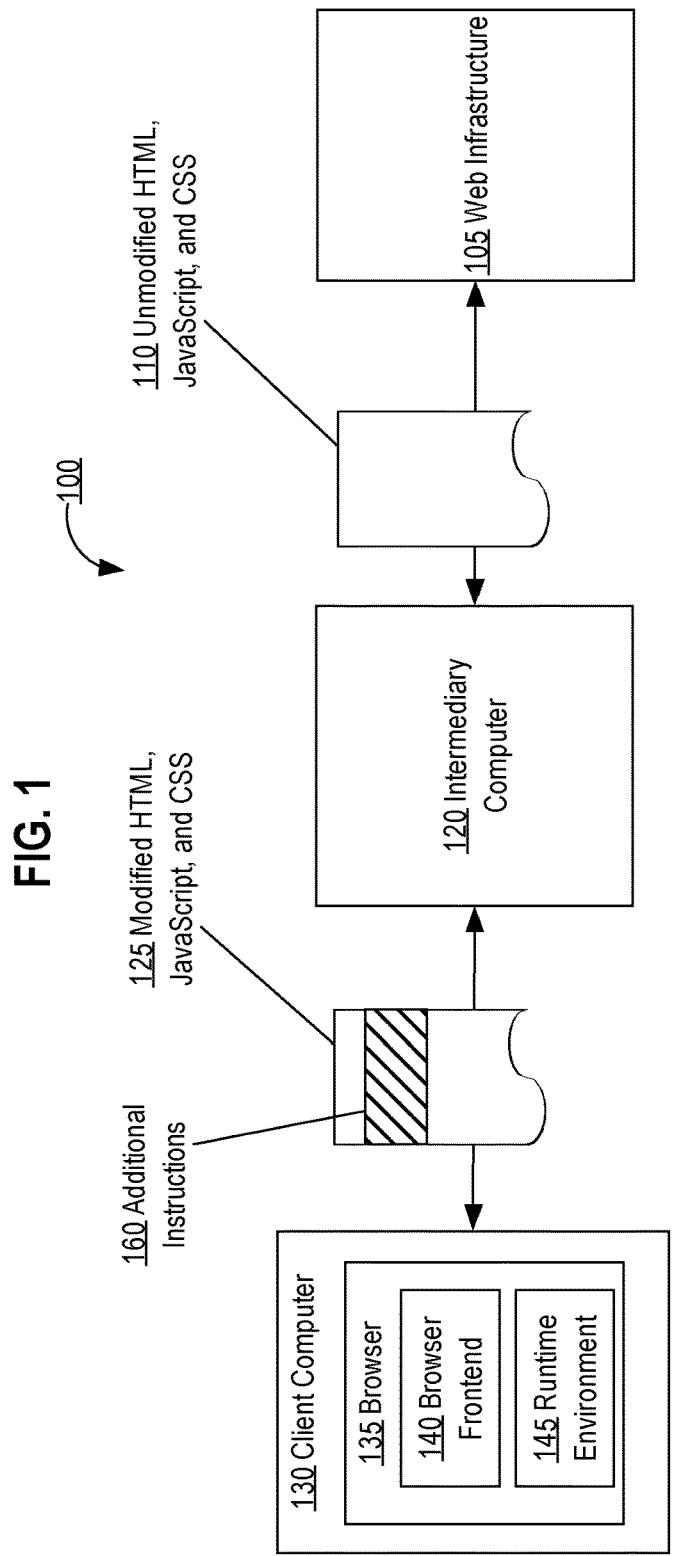
FIG. 1 illustrates functional units of a computer system that is configured to improve security of server computers interacting with client computers.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Computer System for Source Code Obfuscation
   2.1 Browser
   2.2 Web Infrastructure
   2.3 Intermediary
3.0 Transforming First Party Source Code Instructions
4.0 Example Source Code Obfuscation Transformations
   4.1 Unobtrusive Obfuscations
      4.1.1 Numeric Expression Substitution
      4.1.2 Literal Deconstruction
      4.1.3 Visually Similar Identifiers
   4.2 Obfuscation Transformations that Generate Functions
      4.2.1 Code Extraction
      4.2.2 Code Injection
      4.2.3 Immediately-Invoked Function Expression
      4.2.4 Recursive Function Injection
5.0 Implementation Mechanisms—Hardware Overview
6.0 Other Aspects of Disclosure

1.0 General Overview

A computer implemented method for improving security of a server computer that is configured to deliver computer program instructions to a remote client computer, and comprising, using an intermediary computer that is topologically interposed between the server computer and the remote client computer is provided. In an embodiment, the intermediary computer is configured to intercept a first set of source code instructions from the server computer. The first set of source code instructions are configured to achieve an expected result when executed by a web browser on the client computer. The intermediary computer is configured to identify first party operations within the first set of source code instructions, where the first party operations include operations on objects and the objects referenced by the first set of source code instructions. The intermediary computer is configured to identify a first set of operations within the first party operations that are configured to define values for one or more objects based on one or more constants. The intermediary computer then generates a second set of operations, where the second set of operations are configured to define same values for the one or more objects, when executed by a web browser on the client computer. The intermediary computer transforms the first party operations into transformed party operations by substituting the first set of operations with the second set of operations. The intermediary computer generates a second set of source code instructions that are based on the first set of source code instructions and the transformed first party operations. The intermediary computer then sends the second set of source code instructions to the client computer.

Embodiments discussed herein provide numerous benefits and improvements over the general idea of increasing the resistance of servers to reverse engineering, spoofing, and cracking. Unauthorized reuse of scripts or data is made more difficult. Human analysis is thwarted by reducing the readability of scripts.

2.0 Computer System for Source Code Obfuscation

FIG. 1 illustrates a system comprising a server security system, in an example embodiment. System 100 includes web infrastructure 105, client computer 130, and intermediary computer 120 distributed across a plurality of interconnected networks. While each of the components listed above are illustrated as if running on a separate, computer from each other, one or more of the components listed above may be part of and/or executed on the same computer. For example, intermediary computer 120 and web infrastructure 105 may be executed on the same computer, local area, and/or wide area network. Additionally or alternatively, intermediary computer 120 is a proxy server for web infrastructure 105. Additionally or alternatively, intermediary computer 120 may be physically and/or logically between a router and web infrastructure 105, such that all network data sent to, and/or sent from, web infrastructure 105 over one or more protocols may be intercepted by intermediary computer 120.

2.1. Browser

Browser 135 may be a browser that is executed on client computer 130 and operated by a user using client computer 130. For example, browser 135 may be a web browser that is configured to request data from web infrastructure 105, and receive and execute JavaScript, Hypertext Markup Language (HTML), and/or cascading style sheets (CSS). The browser 135 includes a browser frontend 140 and a runtime environment 145.

The browser frontend 140 may cause one or more objects to be presented and/or updated visually and/or audibly to a user using client computer 130. The browser frontend 140 may receive one or more inputs. For example, in response to a user pressing a particular button on a mouse or keyboard coupled to client computer 130, the browser frontend 140 may receive data from the operating system running on client computer 130 indicating that a user pressed the particular button.

In this context, an "object" may be a data structure that can be identified by an identifier and/or a relationship with another object. For example, an object may have a unique identifier that is a string, such as a name, customer number, or username. Accordingly, the object may be referenced and/or retrieved using the identifier. Also for example, if a particular object is the first child object of a parent object, then the particular object may be referenced and/or retrieved using a pointer to the parent object and then retrieving a pointer to the first child object. The browser frontend 140 and/or the runtime environment 145 may provide one or more Application Programming Interfaces ("APIs") for referencing and/or retrieving objects within a Document Object Model ("DOM"). A DOM may be a cross-platform and language-independent representation of one or more objects that are interrelated. The one or more APIs may allow a user to reference and/or retrieve an object by unique identifier, and/or a relative and/or absolute location in a DOM. Selector APIs and XPaths are two examples of APIs that may be available in a browser to reference and/or retrieve objects within a DOM. An object may be a particular type of object. For example, one object may be a button, another object may be an input, or specifically a text field, and another object may be an image.

The browser frontend 140 and runtime environment 145 may be communicatively coupled. For example, in response to receiving the data from the operating system, the browser frontend 140 may call an operation, or cause an operation to be called, such as method call. One or more of method calls may execute an operation on one or more objects in Document Object Model (DOM) which may update the user interface and the browser frontend 140 accordingly.

2.2. Web Infrastructure

In an embodiment, the web infrastructure 105 depicted in FIG. 1 may be one or more server computers that receive requests for data from users, such as a user using browser 135, through intermediary computer 130. In response, web infrastructure 105 may send data to browser 135, through intermediary computer 130. As illustrated in FIG. 1 the data sent from web infrastructure 105 may include instructions: unmodified HTML, JavaScript, and CSS 110. In an embodiment, instructions are defined as one or more codes that define one or more objects and/or one or more operations. For example, instructions may comprise HTML, JavaScript, CSS, eXtensible Markup Language (XML), ActionScript, Dart, VBScript, Typescript, Ruby, Python, and/or any other standard or proprietary languages or codes that define objects, attributes, relationships between objects, and/or operations.

Figure 2:
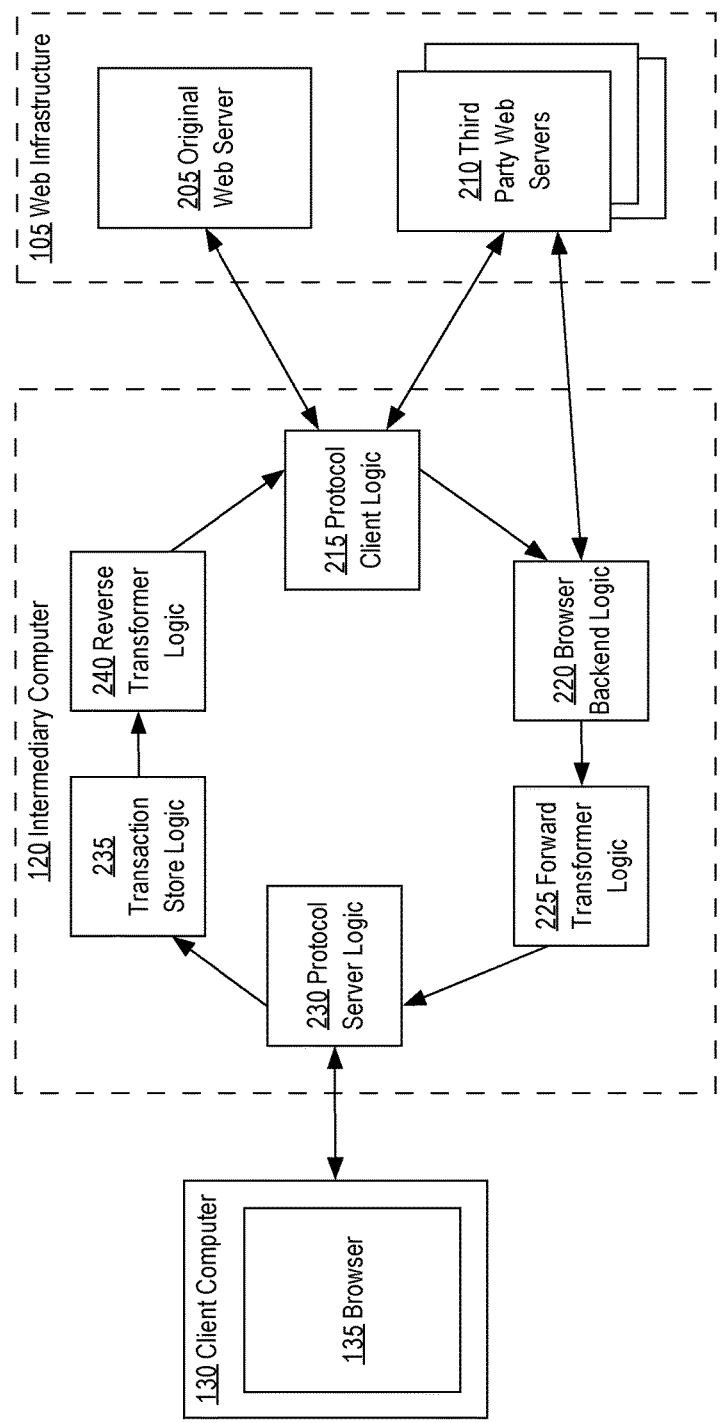
FIG. 2 illustrates a more detailed view of the functional units within a web infrastructure, an intermediary computer, and client computers.

FIG. 2 illustrates a web infrastructure in an example embodiment. The web infrastructure 105 may be described with reference to original web server computer 205 and second party web server computers 210 in FIG. 2, but using the particular arrangement illustrated in FIG. 2 is not required in other embodiments.

Original web server computer 205 may be a server computer that receives requests for data and responds with data. For example, original web server computer 205 may be an HTTP-based web server that receives HTTP requests and responds with data comprising HTML, JavaScript, and/or CSS instructions.

Second party web server computers 210 may be one or more server computers that store additional source code that may be used for various operations including, but not limited to, logging, collecting telemetry data, or source code used for obfuscating objects and/or operations.

2.3. Intermediary

In an embodiment, the intermediary computer 120, as depicted in FIG. 1, may intercept first party source code instructions sent from web infrastructure 105, generate new source code instructions, and send the new source code instructions to browser 135. For example, intermediary computer 120 may intercept first party unmodified HTML, JavaScript, and CSS 110 from, add second party additional source code instructions 160 to implement a set of additional operations, generate modified HTML, JavaScript, and CSS 125 (which may be different than HTML, JavaScript, and CSS 110), and send the modified HTML, JavaScript, CSS 125, which includes the additional source code instructions 160, to browser 135. Additionally, intermediary computer 120 may intercept a request from browser 135, generate a new, modified request, and send the new, modified request to web infrastructure 105.

In FIG. 2, the intermediary computer 120 may be an HTTP intermediary that intercepts and modifies HTML, JavaScript, CSS, and HTTP requests for HTTP web browsers. However, the intermediary computer 120 may be an intermediary for any other standard and/or proprietary protocol. The intermediary computer 120 may also add additional source code instructions to the modified HTML, JavaScript, and/or CSS 125. Furthermore, each of the components discussed, which the intermediary computer 120 is comprised of, may be configured to perform any of the processes and/or methods discussed herein for any standard and/or proprietary protocol.

The intermediary computer 120 may be a server computer that is located on the same network as web infrastructure 105. Additionally or alternatively, intermediary computer 120 may be topologically located between a public-facing router and web infrastructure 105, logically and/or physically. The intermediary computer 120 may be located in a shared computing facility such as a co-location facility, with or without the web infrastructure 105. The intermediary computer 120 also may be implemented as a software process that executes in a general-purpose computer system that is co-located with the web infrastructure 105, or is hosted using a shared computing facility such as a private datacenter or public datacenter or cloud computing facility. In any of these embodiments, the intermediary computer 120 may execute using one or more virtual machine instances. Using any of these embodiments, requests from browser 135 to web infrastructure 105 may be passed through and/or modified by intermediary computer 120. Furthermore, instructions from web infrastructure 105 to browser 135 may be passed through and/or modified by intermediary computer 120.

FIG. 2 illustrates a more detailed view of the intermediary computer 120, in an example embodiment. The intermediary computer 120 may be described with reference to several components illustrated in FIG. 2 and discussed in detail below, but using the particular arrangement is not required in other embodiments. The intermediary computer 120 may comprise protocol client logic 215, browser backend logic 220, forward transformer logic 225, protocol server logic 230, transaction store logic 235, and reverse transformer logic 240. In an embodiment, each of the functional units of intermediary computer 120 may be implemented using any of the techniques further described herein in connection with FIG. 4; for example, the intermediary computer 120 may comprise a general-purpose computer configured with one or more stored programs which when executed cause performing the functions described herein for the intermediary computer 120, or a special-purpose computer with digital logic that is configured to execute the functions, or digital logic that is used in other computing devices.

Protocol client logic 215 may intercept data over any standard or proprietary protocol. For example, Protocol client logic 215 may intercept data over HTTP. Accordingly, Protocol client logic 215 may be communicatively coupled with web infrastructure 105, original web server computer 205, and third party web server computers 215.

Browser backend 220 may be an HTTP-based headless browser. Additionally or alternatively, browser backend logic 220 may be a headless browser based on one or more other standard and/or proprietary protocols. Browser backend 220 may make requests for second party additional source code instructions from second party web server computers 210 for the purpose of injecting and/or substituting second party source code instructions into the first party source code instructions intercepted over HTTP.

In an embodiment, the browser backend logic 220 may parse the first party source code instructions intercepted by protocol client logic 215 to identify a set of operations. An operation may be any function, method, script, and/or any other code, which when executed operates on an object. In an embodiment, operations may also be objects themselves. In an embodiment, the browser backend logic 220 may generate and store the objects and/or operations in memory that have been parsed from the first party source code instructions intercepted.

In an embodiment, browser backend logic 220 may create additional operations from the second party additional source code instructions and the identified set of operations from the first party source code. These additional operations may be used for the purposes of logging specific function calls and/or collecting telemetry data related to specific function calls. These types of additional operations may include be referred to as supervisor operations. Supervisor operations are operations designed to track specific function calls executed by the browser 135. The supervisor operations may also include functions, methods, scripts, and/or other code. For example, a supervisor operation may include an operation from the original first party source code instructions, referred to as a base operation, such that when the supervisor operation is invoked the invocation is logged and then the base operation from the original first party code instructions is executed. By embedding, the base operation from the original first party code instructions within the supervisor operation, the intermediary computer 120 may be able to track when and how often the original base operation is executed.

In an embodiment, additional operations may also include a set of operations which, when invoked perform a function call that does not affect the output of the original first party source code instructions embedded within it. These types of additional operations may be used for the purpose of obfuscating the original function call within the original first party code.

The browser backend logic 220 may notify forward transformer logic 225 of the set of generated additional operations and the identified set of operations from the first party source code instructions and to begin generating new transformed source code instructions based on the objects and/or operations that are currently in memory.

The forward transformer logic 225 may operate on the objects and/or operations created by the browser backend logic 220, to generate one or more attribute maps and/or DOM maps, a new set of transformed instructions based on the one or more operations and/or objects in memory, and add additional operations.

For example, browser backend logic 220 may modify the objects and/or operations in memory according to one or more real-time polymorphic methods: modifying one or more object identifiers, attribute, or relationship(s) with one or more other objects. Then the forward transformer 336 may send the transformed instructions to protocol server logic 230 based upon the objects and/or operations in memory. The forward transformer logic 225 may send the attribute maps and/or DOM maps to transaction store 240.

Protocol server logic 230 may receive the transformed instructions generated by forward transformer logic 225 and send the transformed instructions to browser 135. Additionally or alternatively, protocol server logic 230 may intercept requests from browser 135 and forward the requests to transaction store logic 235.

The transaction store logic 235 may receive requests intercepted by protocol server logic 230 from browser 135. Transaction store 235 may retrieve one or more attribute maps and/or DOM maps, based on data in the request, and forward the request with the retrieved one or more attribute maps and/or DOM maps to reverse transformer logic 240. Accordingly, transaction store logic 235 may be communicatively coupled with reverse transformer logic 240.

In an embodiment, the transaction store logic 235 may receive requests related to supervisor operations that were inserted into the modified source code instructions that were sent to the browser 135. The transaction store logic 235 may store the requests related to supervisor operations into data storage, coupled to the intermediary computer 120, as telemetry data which then may be used to analyze the frequency and origin of specific function calls monitored.

The reverse transformer logic 240 may transform requests intercepted by protocol server logic 230, which are based on instructions generated by forward transformer logic 225, into requests that would have been generated by browser 135 had browser 135 received the original instructions sent from original web server computer 205. Reverse transformer 240 may transform requests based on the one or more attribute maps and/or DOM maps retrieved by transaction store logic 235. Reverse transformer 240 may send the transformed request to original web server computer 205 through protocol client logic 215.

3.0. Transforming First Party Source Code Instructions

Figure 3:
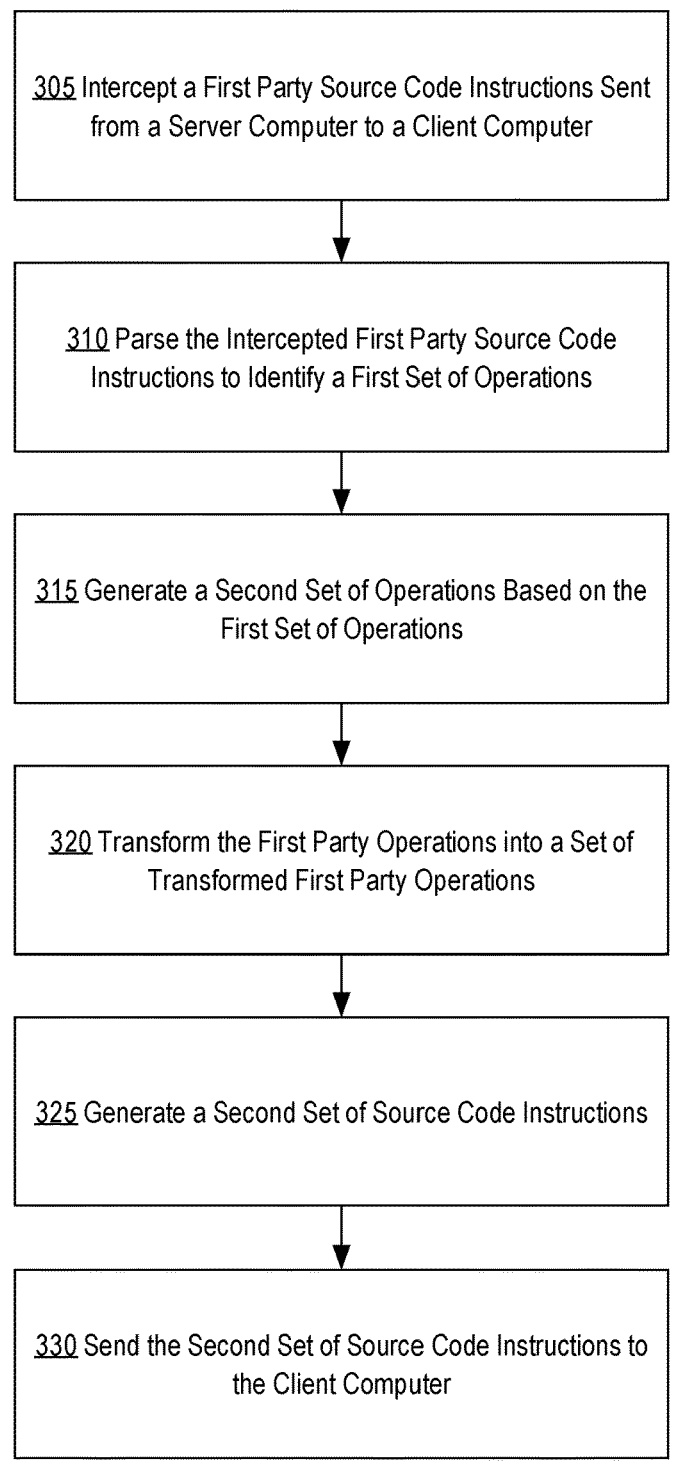
FIG. 3 illustrates a process for improved security by injecting additional source code instructions into original source code instructions, sent by server computers, and then sending the modified source code instructions to client computers.

FIG. 3 illustrates an example process for improved security by inserting second party source code instructions into the original first party source code instructions and then sending transformed source code instructions to the browser 135. For purposes of illustrating a clear example, FIG. 3 may be described with reference to FIG. 1 and FIG. 2, but using the particular arrangements illustrated in FIG. 1 and FIG. 2 are not required in other embodiments.

At step 305, the intermediary computer 120 intercepts the first party source code instructions from the original web server 205. For example, the protocol client logic 215 may receive instructions from the original web server 205, in response to a request from the browser 135.

At step 310, the intermediary computer 120 parses the first party source code instructions to identify a set of operations. In an embodiment, the browser backend logic 220 parses the first party source code instructions to identify a set of first party operations. For example, the protocol client logic 215 may send a first set of HTML and/or JavaScript instructions to the browser backend logic 220. The Browser backend 220 may parse the received HTML and/or JavaScript instructions into an abstract syntax tree. For the purposes of illustrating a clear example, assume that the intercepted set of instructions include instructions that define an original set of JavaScript methods that operate on one or more original objects using original object identifiers. In an embodiment, the browser backend logic 220 may use semantic analysis to determine which operations assign static literals to objects. These identified operations may be identified as a subset of operations that qualify for modification with second party source code instructions. The subset of operations is herein referred to as a first set of operations.

Snippet 1 is an example of first party operations that the browser backend logic 220 may analyze to determine whether an operation assigns a static literal to a variable.

Figure 4:
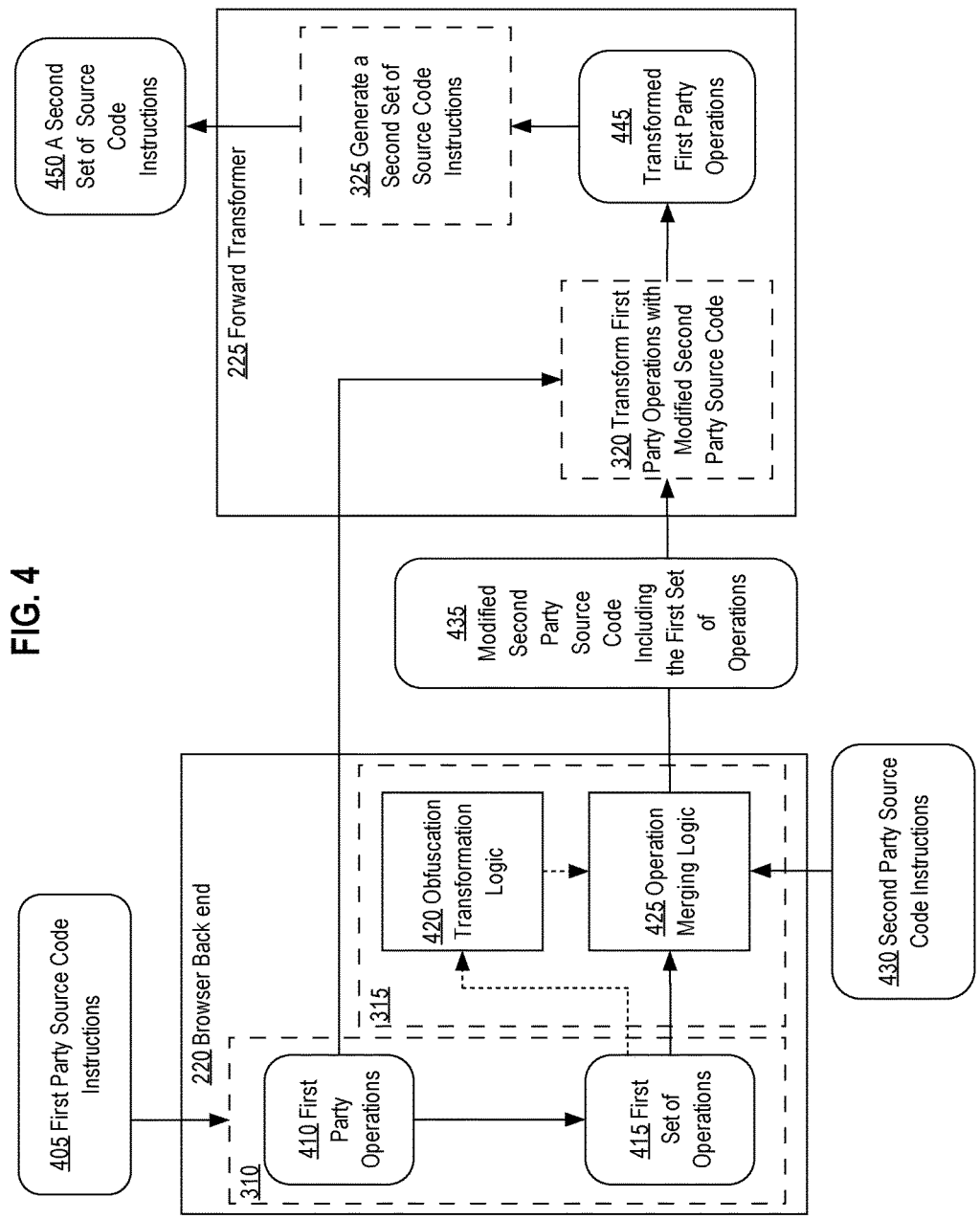
FIG. 4 illustrates an example of generating a second set of source code instructions based upon a subset of original operations and additional second party source code instructions.

Snippet 1:
line 01: var val=4;
line 02: var doubledVal=value*2;

In an embodiment, the browser backend logic 220 may identify line 01 as a static literal assignment to a variable. In this case, the browser backend logic 220 would include line 01 as part of a first set of operations suitable for modification and/or substitution using second party source code instructions. FIG. 4 illustrates an example of generating a second set of source code instructions from the first set of operations identified and the second party source code instructions. First party source code instructions 405 represents the first party source code instructions intercepted by the protocol client logic 215. The browser backend logic 220 receives the first party source code instructions 405 and identifies operations, such as JavaScript operations, within the first party source code instructions 405. The identified operations are referred to as first party operations 410 and include all operations on objects and objects themselves. The browser backend logic 220 then identifies a first set of operations to be modified and/or substituted, referred to as a first set of operations 415. In an embodiment, the first set of operations 415 includes operations that include assignments of static literals to objects.

At step 315, the browser backend logic 220 generates a second set of operations that are based upon the first set of operations 415 identified by the browser backend logic 220 and received second party source code instructions 430 from the second party web servers 210.

In an embodiment, block 425 illustrates merging the first set of operations 415 with the second party source code instructions 430 by either modifying or substituting part of the first set of operations 415. For example, line 01 from Snippet 1 (above) may be partially modified by substituting the static literal with second party source code instructions 430 that include function calls including the original static literal from line 01. Snippet 2 is an example of additional second party source code that may be added to line 01 of Snippet 1.

Snippet 2:
line 03: document.addEventListener('click', function( ) {console.log("Document was clicked")});

Snippet 2 illustrates an example of second party source code instructions that add logging functionality to JavaScript code. When added to the first set of operations 415, the second party source code instructions 430 do not affect the result of the first set of operations 415. Snippet 3 illustrates inserting line 03 into line 01 using an immediately invoked function expression (IIFE). An IIFE is a self-executing anonymous function that is defined in an expression that is immediately executed by the browser. By inserting snippets of original operations, such as assignments of static literals, into IIFEs, reading source code to determine the output of the source code becomes more difficult. For example, if a bot tried to parse and read modified source code by removing inserted IIFEs then the bot would end up with unpredictable source code because by removing the inserted IIFEs the bot would also be removing parts of the original source code that included assignments of static literals to essential objects. Snippet 3 depicts an example inserted IIFE with an embedded assignment of a static literal.

Snippet 3:
line 01: var val = (function ( ) { document.addEventListener ('click', function( ) {console.log("Document was clicked" ) }) ; return 4; } ( );

In Snippet 3, the function described in line 03 has been implemented within an IIFE and the static literal "4" has been appended to the end of the IIFE so that the returned result of the function is the original static literal, which is assigned to object val.

In an embodiment, before merging the first set of operations 415 with the second party source code instructions 430, the browser backend logic 220 may implement obfuscation transformation logic 420 on the first set of operations 415. Obfuscation transformation is a technique reconfiguring operations from one form to another form that distorts the structure of the operation without altering the effects of the operation. For example, line 01 of Snippet 1 may be transformed into the following obfuscated Snippet 4.

Obfuscated Snippet 4:
line 01: var val=[~~(Math.LOG 10E*10)];

In an embodiment, browser backend logic 220 may transform original line 1 into the obfuscated line 1 above, where the obfuscated line 1 is a mathematical expression that when evaluated returns "4", which is the same value assigned to "val" in original line 1. The result of the obfuscation transformation logic 420 may then be merged with second party source code instructions 430 by the operation merging logic 425. Additional embodiments of obfuscation techniques are described in detail in the EXAMPLE SOURCE CODE OBFUSCATION TRANSFORMATIONS section herein.

Snippet 5 illustrates an embodiment of a static literal assignment operation that is transformed using obfuscation transformation logic 420 and then merged with second party source code instructions 430 using operation merging logic 425.

Snippet 5:
(Block 415)
(original)
line 01: var val=4;
(obfuscated transformation)
line 02: var val=[~~(Math.LOG 10E*10)];
(Block 420)
(second party source code to be added)
line 03: document.addEventListener('click', function( ) {console.log("Document was clicked")});
(line 02 merged with obfuscated line 1)
line 04: var val=(function ( ) {document.addEventListener('click',function( ) {console.log("Document was clicked")});
return [~~(Math.LOG 10E*10)];} ( );
Block 435 represents a modified second party source code 435, which is the output of merging the second party source code instructions 430 with the first set of operations 415. In the example above, line 04 is the combination of the obfuscation transformation of line 02 combined with the second party source code instructions 430 of line 03 executed as an IIFE.

At step 320, the forward transformer logic 225 transforms the first party operations 410 by substituting the identified first set of operations 415 with the modified second party source code 435. In an embodiment, if the first set of operations 415 is a set of operations that are assignments of static literals then the forward transformer logic 225 substitutes all identified first set of operations 415 with the modified second party source code 435 to produce a set of transformed first party operations 445. The transformed first party operations 445 include all of the first party operations 410, which are not part of the first set of operations 415, and the modified second party source code 435.

For example, snippet 6 represents the first party operations 410, including operations that are identified as part of the first set of operations 415, and substituting the first set of operations 415 with the modified second party source code 435.

Snippet 6:
line 01: var val=4; (original first set of operations 415)
line 02: var doubledVal=value*2; (original first party operations 410)
Transformed Snippet 6:
(modified second party source code 435)
line 01: line 1a: var val=(function ( ) {document.addEventListener ('click',function( ) {console.log("Document was clicked")});
return [~~(Math.LOG 10E*10)];} ( );
(original first party operations 410)
line 02: line 2: var doubledVal=value*2;
In this example, line 01 is identified as part of the first set of operations 415. Line 02 is part of the first party operations 410, but not part of the first set of operations 415. Therefore only line 01 is substituted with the modified second party source code 435. Transformed snippet 6 represents the result of step 320, the transformed first party operations 445.

At step 325, the forward transformer logic 225 generates a second set of source code instructions 450. In an embodiment, the forward transformer logic 225 replaces the original first party operations 410 that were identified within the first party source code instructions 405 with the transformed first party operations 445 to generate the second set of source code instructions 450. In an embodiment, the second set of source code instructions 450 includes the transformed first party operations 445, which represents identified JavaScript operations, and any other source code that was part of the first party source code instructions 405 and was not previously parsed and identified as JavaScript operations, such as HTML and/or CSS. In another embodiment, the transformed first party operations 445 may represent identified scripting operations other than JavaScript. The second set of source code instructions 450 is then sent to the protocol server logic 230 for forwarding to the browser 135. At step 330, the protocol server logic 230 sends the second set of source code instructions to the browser 135.

4.0. Example Source Code Obfuscation Transformations

In various embodiments, obfuscation transformation logic 420 implements, one or more of the obfuscation transformations that are described in this section. Any one or more of these obfuscations may be combined, such that a statement may be obfuscated by multiple transformations. For purposes of illustrating clear examples, source code snippets set forth in this section show JavaScript, but in other embodiments, the obfuscations described in this section are applicable to other scripting languages. The statements in this section may serve as a functional specification and/or design specification that a skilled programmer, software engineer, and/or computer engineer may use to implement an embodiment using any suitable programming development environment, programming language, digital logic, or other computer elements. This section may serve as an example of steps that may be used for implementing the claimed functions recited in the claims and are provided in sufficient detail such that one skilled in the art would know how to program a microprocessor or computer to perform the steps of the claims in any of various embodiments.

4.1. Unobtrusive Obfuscations

Some obfuscation transformations do not alter the structure of a script. Examples include peephole obfuscations that can be applied to an individual statement without consideration of interdependencies that involve surrounding statements.

4.1.1. Numeric Expression Substitution

An integer literal is a more human readable way to define a number. A less readable way is to define an expression that calculates the number when executed in browser 135. The expression may include operators, literal operands, and symbolic operands. In an embodiment, obfuscation transformation logic 420 may scan original JavaScript operations for occurrences of an integer literal. Obfuscation transformation logic 420 may find a snippet of JavaScript operations such as Original Snippet 7.

Original Snippet 7:
line 03:tries=6;
line 04:skill=0;

When processing Original Snippet 7, obfuscation transformation logic 420 may apply a transformation that replaces integer literals "6" and "0" with an expression that uses a different literal to achieve the same result when executed in browser 135. Such a transformation yields Obfuscated Snippet 7. Implementations of obfuscation transformation logic 420 may use different literals and operators to compose the expression.

Obfuscated Snippet 7:
line 01:tries=2*Number.MIN_VALUE/
line 02: Number.MIN_VALUE*3;
line 03:skill=~~";

4.1.2 Literal Deconstruction

A string literal is a more human readable way to define a character string. A less readable way is to define a concatenation of substrings that assembles the character string when executed in browser 135. According to literal deconstruction obfuscation, the obfuscation transformation logic 420 may scan original JavaScript operations for occurrences of a string literal. the obfuscation transformation logic 420 may find a snippet of JavaScript such as Original Snippet 8.

Original Snippet 8:
line 01:title="Today's Important Headlines";

When processing Original Snippet 8, the obfuscation transformation logic 420 may apply a transformation that decomposes the string literal into substrings that are concatenated to achieve the same result when executed in browser 135. Such a transformation yields Obfuscated Snippet 8. Implementations of the obfuscation transformation logic 420 may use different heuristics for deciding at which points to sever the string literal into substrings. For example the substrings may have identical or random lengths. An implementation may define substrings that each are composed of only vowels, only consonants, or only punctuation. For example no substring of Obfuscated Snippet 8 has both a vowel and a consonant.

Obfuscated Snippet 8:
line 01: title="T"+"o"+"d"+"ay'"+
line 02: "s"+"I"+"mp"+"o"+"rt"+"a"+
line 03: "nt H"+"ea"+"dl"+"i"+"n"+"e"+"s";

String assembly by a concatenation operator is not the only way to perform literal deconstruction obfuscation. Passing an array of substrings to a join function may accomplish the same obfuscation in a different way. The join function may achieve greater obfuscation because it allows removal of a common character from the substrings. An implementation may scan a string literal to discover a most frequent character and then use that character as a separator with which to split the string literal into substrings that lack that character. The obfuscation transformation logic 420 may find a JavaScript operation such as Original Snippet 9.

Original Snippet 9:
line 04: title="Today's Important Headlines";

When processing Original Snippet 9, the obfuscation transformation logic 420 may use an "a" character as a separator to split the string literal into substrings that are joined to achieve the same result when executed in browser 135. Such a transformation yields Obfuscated Snippet 9.

Obfuscated Snippet 9:
line 05: title=["Tod","y's Import", "nt He", "dlines" ].join ("a");

4.1.3 Visually Similar Identifiers

A JavaScript identifier may be composed by selecting letters from hundreds of strange Unicode letters. A distinct and meaningful name is a more human readable way of declaring a variable. A less readable name is meaningless and similar to other variable names. In an embodiment, the obfuscation transformation logic 420 may scan the original JavaScript operations for occurrences of a variable name. The obfuscation transformation logic 420 may find a snippet of JavaScript such as Original Snippet 10.

Original Snippet 10:
line 06: subject="This web page";
line 07: verb="works";
line 08: sentence=subject+verb+".";

When processing Original Snippet 10, the obfuscation transformation logic 420 may use visually similar names to rename variables to achieve the same result when executed in browser 135. Such a transformation yields Obfuscated Snippet 10. Implementations of the obfuscation transformation logic 420 may generate a variable name by repetition of a few base letters. Repetition reduces readability because a human has difficulty distinguishing between two variable names composed of the same repeating letter, but repeated different amounts. Occurrences of a base letter may modified by adding a diacritic. Diacritics reduce readability because they are unfamiliar and visually subtle. Diacritics may be drawn from multiple natural languages to ensure unfamiliarity.

Obfuscated Snippet 10:
line 09: ïïiïïïïi="This web page";
line 10: ïïiïïïïii="works";
line 11: ïïiïïïïi=ïïiïïïïi+ïïiïïïïi+"•";

4.2. Obfuscation Transformations that Generate Functions

Obfuscation is an example of logic refactoring. Many refactorings are accomplished by introducing a function. The obfuscation transformation logic 420 may define a function that is not defined in original JavaScript operations. The obfuscation transformation logic 420 may also invoke the function. The definition and invocation of the function may occur in adjacent statements or may be separated by other statements to decrease human readability. The name of the function may be similar to the name of another function to decrease human readability.

4.2.1. Code Extraction

Directly in line is a more human readable way to use an expression. A less readable way is to extract the expression into a function and invoke the function to achieve the same result when executed in browser 135. According to code extraction obfuscation, the obfuscation transformation logic 420 may scan original JavaScript operations for occurrences of an expression. The obfuscation transformation logic 420 may find a snippet of JavaScript such as Original Snippet 11.

Original Snippet 11:
line 12: perimeter=2*(width+height);

When processing Original Snippet 11, the obfuscation transformation logic 420 may extract the right hand side of the equation into a function and then invoke the function to achieve the same result when executed in browser 135. Such a transformation yields Obfuscated Snippet 11. Although the definition and invocation of the function are shown on adjacent lines, adjacency is not required and may be avoided to hide the function definition. An implementation may also rely on automatic declaration hoisting within a JavaScript scope to further hide the function declaration. Depending on the placement of the function definition, the signature of the function may need arguments for variables used in the extracted expression.

Obfuscated Snippet 11:
line 13: function foo( ) {
line 14: return 2*(width+height);}
line 15: perimeter=foo( );

4.2.2. Code Injection

Directly in line is a more human readable way to use an expression. A less readable way is to inject new expressions and/or functions that modify one or more original objects such that the multiple modifications achieve the same result when executed in browser 135. According to code injection obfuscation, the obfuscation transformation logic 420 may scan original JavaScript operations for occurrences of an expression to modify with injected code. For example, the obfuscation transformation logic 420 may apply encryption functionality to an original JavaScript expression, then define and invoke a function that decrypts the previously encrypted JavaScript expression. The obfuscation transformation logic 420 may find a snippet of JavaScript such as Original Snippet 12.

Original Snippet 12:
line 16: perimeter=2*(width+height);

When processing Original Snippet 12, the obfuscation transformation logic 420 may add an additional encryption function call after the Original Snippet 12, and then define and invoke an additional function that decrypts the encrypted Original Snippet 12, as shown in Obfuscated Snippet 12.

Obfuscated Snippet 12:
line 17: perimeter=2*(width+height);
line 18: encrypt(perimeter);
line 19: function foo(var) {
line 20: return decrypt(var);}
line 21: foo(perimeter);

4.2.3. Immediately-Invoked Function Expression

A literal is a more human readable way to use a value. A less readable way is to define a closure that returns the value when invoked in browser 135. According to immediately-invoked function expression obfuscation, the obfuscation transformation logic 420 may scan original JavaScript operations for occurrences of a literal. The literal may be number, a string, or an object. The obfuscation transformation logic 420 may find a snippet of JavaScript such as Original Snippet 13.

Original Snippet 13:
line 22: age=9;

When processing Original Snippet 13, the obfuscation transformation logic 420 may define a JavaScript immediately-invoked function expression to achieve the same result when executed in browser 135. Such a transformation yields Obfuscated Snippet 13.

Obfuscated Snippet 13:
line 23: age=(function( ){return 9;}( ));

4.2.4. Recursive Function Injection

An integer literal is a more human readable way to define a number. A less readable way is to define a recursive function that when invoked with particular argument values may achieve the same result when executed in browser 135. According to recursive function injection obfuscation, the obfuscation transformation logic 420 may scan original JavaScript operations for occurrences of an integer literal. The obfuscation transformation logic 420 may find a snippet of JavaScript such as Original Snippet 14.

Original Snippet 14:
line 24: age=9;

When processing Original Snippet 14, the obfuscation transformation logic 420 may define a recursive function having a counter parameter and an accumulator parameter to achieve the same result when executed in browser 135. Such a transformation yields Obfuscated Snippet 14. When invoked with particular values for the counter and the accumulator, the function may recursively decrement the counter until zero. Each recursive invocation of the function may adjust the accumulator by a specific amount. Although the definition and invocation of the recursive function are shown on adjacent lines, adjacency is not required and may be avoided to hide the function definition.

Obfuscated Snippet 14:
line 25: function recurs(counter,accumulator) {
line 26: if (0==counter) return accumulator;
line 27: return recurs(counter−1,accumulator+2);}
line 28: age=recurs(6,−3);

5.0. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
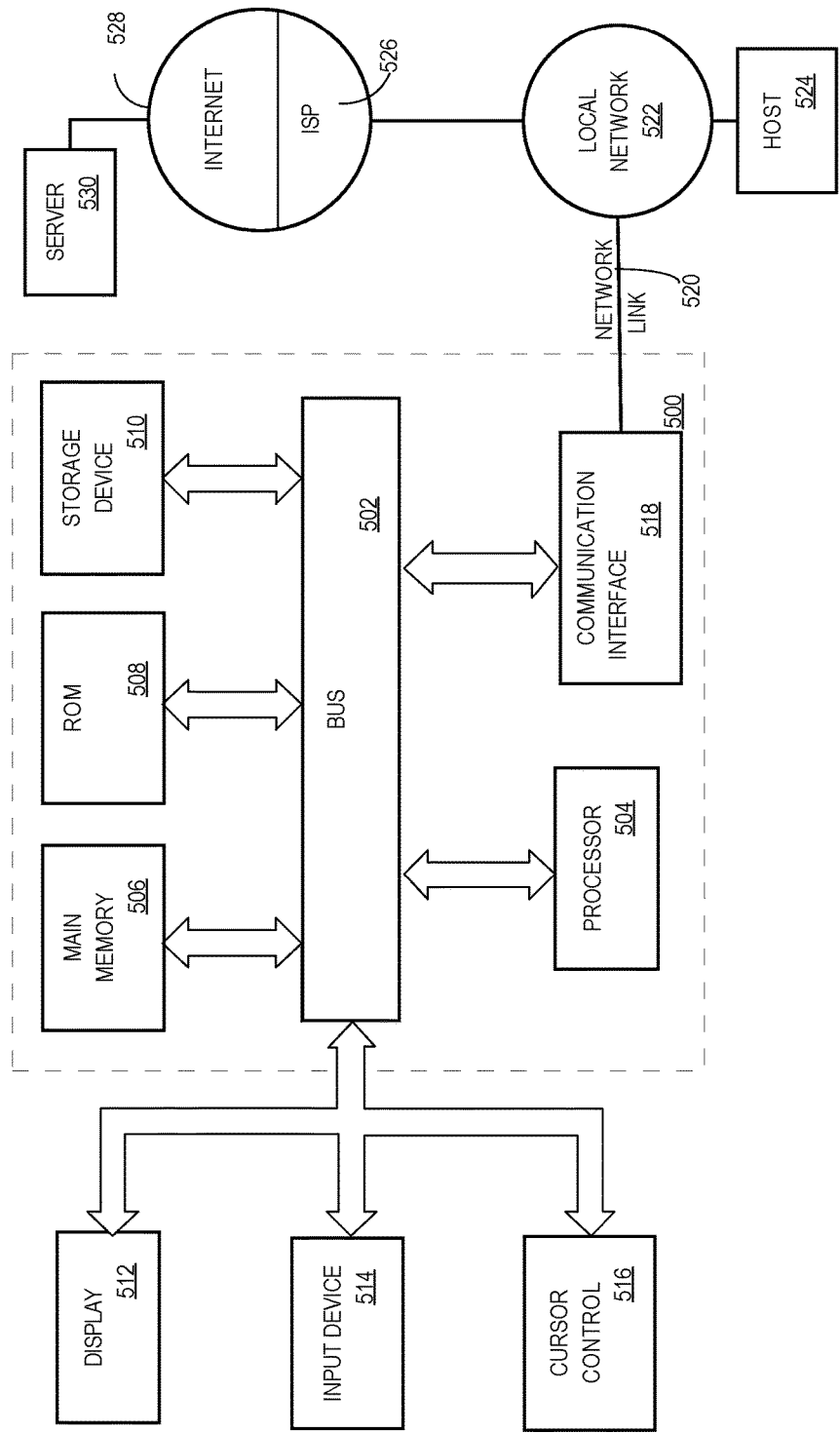
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0. Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
identifying, within a set of source code instructions requested by a client computer, one or more first instructions that cause assignment of a literal to a variable when executed;
generating one or more additional instructions including a function that returns the literal when the one or more additional instructions are executed;
generating one or more second instructions by combining the one or more first instructions and the one or more additional instructions such that the variable is assigned the literal only when the one or more additional instructions execute and return the literal on the client computer;
generating a transformed set of source code instructions by replacing the one or more first instructions with the one or more second instructions in the set of source code instructions; and
transmitting the transformed set of source code instructions to the client computer;
wherein execution of the transformed set of source code on the client computer without executing the one or more second instructions results in unpredictable source code due to the variable being undefined;
wherein the method is performed by one or more computing devices.

2. The computer-implemented method of claim 1, wherein generating the one or more second instructions comprises applying one or more obfuscation transformations to the one or more first instructions before combining the one or more first instructions within the one or more additional instructions.

3. The computer-implemented method of claim 2, wherein the one or more second instructions include a first modification expression configured to set the variable to a second value and a second modification expression configured to modify the second value of the variable to the literal.

4. The computer-implemented method of claim 3, wherein the first modification expression is configured to apply encryption to the literal; and
wherein the second modification expression is configured to apply decryption to the second value of the variable.

5. The computer-implemented method of claim 1, wherein the one or more second instructions comprise an Immediately Invoked Function Expression (IIFE) that executes the one or more additional instructions that invoke one or more additional operations.

6. The computer-implemented method of claim 1, wherein the one or more additional instructions define one or more supervisor operations designed to track invocation of one or more base operations, wherein the one or more supervisor operations are defined in the browser when the transformed set of source code instructions is executed on the client computer.

7. The computer-implemented method of claim 1, wherein the one or more additional instructions define one or more supervisor operations designed to track one or more calls to a specific function that is defined by a runtime environment; and
wherein the one or more second instructions, when executed in the runtime environment on the client computer, cause:
sending a set of telemetry data indicating that the specific function call was made.

8. The computer-implemented method of claim 7, further comprising:
receiving, from the client computer, the set of telemetry data;
storing the set of telemetry data which indicates that one or more calls were made to the specific function.

9. The computer-implemented method of claim 8, further comprising analyzing the frequency and origin of the one or more calls to the specific function.

10. The computer-implemented method of claim 1, wherein the one or more second instructions comprise a statement defining a closure having a body that is configured to return the literal when after invocation of the closure when the one or more second instructions are executed by the client computer.

11. The computer-implemented method of claim 10, wherein the statement comprises a JavaScript IIFE.

12. A computer system comprising:
one or more hardware processors;
a memory coupled to the one or more hardware processors and storing one or more instructions which, when executed by the one or more hardware processors, cause the one or more hardware processors to:
identify, within a set of source code instructions requested by a client computer, one or more first instructions that cause assignment of a literal to a variable when executed;
generating one or more additional instructions including a function that return the literal when the one or more additional instructions are executed;
generate one or more second instructions by combining the one or more first instructions and the one or more additional instructions such that the variable is assigned the literal only when the one or more additional instructions execute and return the literal on the client computer;
generate a transformed set of source code instructions by replacing the one or more first instructions with the one or more second instructions in the set of source code instructions; and
transmit the transformed set of source code instructions to the client computer;
wherein execution of the transformed set of source code on the client computer without executing the one or more second instructions results in unpredictable source code due to the variable being undefined.

13. The computer system of claim 12, wherein generating the one or more second instructions comprises applying one or more obfuscation transformations to the one or more first instructions before combining the one or more first instructions within the one or more additional instructions.

14. The computer system of claim 13,
wherein the one or more second instructions include a first modification expression configured to set the variable to a second value and a second modification expression configured to modify the second value of the variable to the literal.

15. The computer system of claim 14,
wherein the first modification expression is configured to apply encryption to the literal; and
wherein the second modification expression is configured to apply decryption to the second of the variable.

16. The computer system of claim 12, wherein the one or more second instructions comprise an Immediately Invoked Function Expression (IIFE) that executes the one or more additional instructions that invoke one or more additional operations.

17. The computer system of claim 12, wherein the one or more additional instructions define one or more supervisor operations designed to track invocation of one or more base operations, wherein the one or more supervisor operations are defined in the browser when the transformed set of source code instructions is executed on the client computer.

18. The computer system of claim 12,
wherein the one or more additional instructions define one or more supervisor operations designed to track one or more calls to a specific function that is defined by a runtime environment; and
wherein the one or more second instructions, when executed in the runtime environment on the client computer, cause:
sending a set of telemetry data indicating that the specific function call was made.

19. The computer system of claim 18, wherein the one or more instructions, when executed by the one or more hardware processors, cause the one or more hardware processors to:
receive, from the client computer, the set of telemetry data;
store the set of telemetry data which indicates that one or more calls were made to the specific function.

20. The computer system of claim 19, wherein the one or more instructions, when executed by the one or more hardware processors, cause the one or more hardware processors to:
analyze the frequency and origin of the one or more calls to the specific function.

21. The computer system of claim 12,
wherein the one or more second instructions comprise a statement defining a closure having a body that is configured to return the literal when after invocation of the closure when the one or more second instructions are executed by the client computer.

22. The computer system of claim 21, wherein the statement comprises a JavaScript IIFE.

* * * * *